United States Patent [19]

Berger et al.

[11] Patent Number: 4,679,166
[45] Date of Patent: Jul. 7, 1987

[54] CO-PROCESSOR COMBINATION

[75] Inventors: Michael F. Berger, Fort Worth; Sammy D. Sawyer, Arlington, both of Tex.

[73] Assignee: Tandy Corporation, Fort Worth, Tex.

[21] Appl. No.: 796,760

[22] Filed: Nov. 12, 1985

Related U.S. Application Data

[63] Continuation of Ser. No. 458,541, Jan. 17, 1983, Pat. No. 4,590,556.

[51] Int. Cl.$^4$ .............................................. G06F 9/00
[52] U.S. Cl. ................................................... 364/900
[58] Field of Search ............................... 364/200, 900

[56] References Cited

U.S. PATENT DOCUMENTS

| | | | |
|---|---|---|---|
| 3,786,433 | 1/1974 | Notley et al. | 340/172.5 |
| 4,070,704 | 1/1978 | Calle et al. | 364/200 |
| 4,412,286 | 10/1983 | O'Down et al. | 364/200 |
| 4,430,710 | 2/1984 | Catiller et al. | 364/200 |
| 4,471,427 | 9/1984 | Harris | 364/200 |
| 4,481,578 | 11/1984 | Hughes et al. | 364/200 |

FOREIGN PATENT DOCUMENTS 2538895  3/1976  Fed. Rep. of Germany .
2349880 11/1977  France .

OTHER PUBLICATIONS

Folsom et al., "Paired Processors Boost Micro's Performance", *Computer Design*, vol. 21, No. 11, Nov. 1982, pp. 101–106.
Barthmaier, "Multiprocessing System Mixes 8– and 16–Bit Microcomputers", *Computer Design*, vol. 19, No. 2, Feb. 1980, pp. 137–144.

*Primary Examiner*—Thomas M. Heckler
*Assistant Examiner*—John G. Mills
*Attorney, Agent, or Firm*—Wolf, Greenfield & Sacks

[57] ABSTRACT

A dual processor system in which one processor is dedicated to input/output tasks while the other is dedicated to high level language tasks when operating as a 16-bit machine. The processors include a first microprocessor which is an 8-bit machine, and a second microprocessor which is a 16-bit machine. The first processor has a memory associated therewith which may, for example, be a 64K memory while the second processor has a larger capacity memory. The second processor does not access the memory of the first processor, however, the first processor can access a portion of the second processor's memory. Access to the second processor's memory is controlled by an arbitrator that is operated by system software to prevent access conflicts. For boot-up during power-up operation, a boot ROM is used, attached to the 8-bit processor having stored therein a boot strap program that is initially loaded into the 8-bit processor memory. If the operating system loaded from a diskette indicates 8-bit software, then the 16-bit processor is maintained reset or halted. On the other hand, if the operating system is a 16-bit system, then the boot program loads the 16-bit memory making the 16-bit processor the main processor. The 8-bit processor then functions as an I/O processor. This boot-up procedure allows the 8-bit processor to turn on first and makes the system initially appear as an 8-bit processor system. In this way the system is compatible with software written for an 8-bit machine even though the system is normally run and identified as a 16-bit machine.

23 Claims, 3 Drawing Figures

CO-PROCESSOR COMBINATION

BACKGROUND OF THE INVENTION

The present invention relates in general to a microprocessor system particularly one employing dual processors. In a preferred embodiment, the system of this invention is a 16-bit machine and for 16-bit operation, one of the processors is dedicated to input/out tasks while the other processor is dedicated to high-level language tasks. More particularly, the invention pertains to the inter-operation between these processors. One aspect of the present invention is concerned with the boot-up procedure for activating the processors depending upon whether the operating system, normally entered from a disk or diskette, is for an 8-bit or 16-bit machine.

It is an object of the present invention to provide an improved dual processor system having an improved technique for processor operation, particularly at power-up or reset.

Another object of the present invention is to provide a co-processor combination including a 16-bit processor and an 8-bit processor and in which the 8-bit processor is booted up first with the operating system being tested to determine whether or not it is necessary to at all enable the 16-bit processor.

A further object of the present invention is to provide a boot-up procedure in accordance with the preceding objects and which enables the 8-bit processor to turn on first to thus initially make the system appear as an 8-bit system. This has the advantage of making the usual 16-bit machine compatible with 8-bit software written for an 8-bit machine even though the system is normally operated as a 16-bit machine. This feature allows the purchaser to move easily from an 8-bit machine to a 16-bit machine without having to reprogram all operations during the transition.

SUMMARY OF THE INVENTION

To accomplish the foregoing and other objects of this invention, there is provided a co-processor combination which comprises a first processor, a second processor and means intercoupling the first and second processors including an address bus and a data bus associated with the first processor and an address bus and a data bus associated with the second processor. Each of these processors has respective memories and thus the first processor has associated therewith a first memory coupled thereto via the first processor address bus and data bus. Similarly, there is a second memory associated with the second processor and coupled thereto via the second processor address bus and data bus. In accordance with the invention there is provided a third memory associated with the first processor and comprising a read-only memory referred to as a boot ROM for storing a boot strap control program. The boot ROM is operable primarily only at power-up of the microprocessor system. In this connection there is thus provided a detecting power-up reset circuit which includes means for generating a reset signal and means coupling the reset signal to the first processor, causing first processor instruction operation in accordance with the boot strap control program to load the operating system into the first memory. When operating the system as a 16-bit machine, the boot program then is used to control the loading of the software for both processors providing a form of control which makes the second processor the main processor with the first processor functioning as an I/O processor. The particular boot-up type procedure allows the first processor to turn on first and thus makes the microprocessor system initially appear as a first generation or 8-bit system. If the loaded operating system is for 8-bit operation, then the second processor is not enabled but is maintained in a halt state. If on the other hand, the system is to operate as a 16-bit machine, the operating system is entered by way of a different diskette which contains the processor operating system along with an additional code. This additional code causes the first processor to load in the operating system for the second processor into the memory associated with the first processor. The first processor then generates a command to transfer the operating system just entered from the first memory into the second memory. The second processor, however, does not respond immediately because the first processor is controlling it to be in its halt and reset mode. However, after the operating system has been transferred to the second memory, the first processor resets itself and at substantially the same time releases the halt on the second processor. The second processor is then able to boot itself up using the program now stored in its memory. In this way the second processor assumes control of the system and in turn now controls the first processor by means of the internal interrupt operation.

In accordance with a preferred embodiment of the present invention, the first processor may be of the type Z80 having 8 data lines and 16 address lines. The boot ROM connects to the first processor by way of the address and data lines. The boot ROM preferably has 8 data lines and 11 address lines. The first memory associated with this processor preferably has a capacity of 64K and has coupled thereto the 8 data lines and 16 address lines. With respect to the other processor, referred to herein as the second processor, this may be of type MC 68000. The second memory associated with this processor is a larger capacity memory than the first memory and is preferably a random access memory wit a total capacity of 128K words (256K bytes) of data with operational byte parity for error detection.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION

Figure 1:
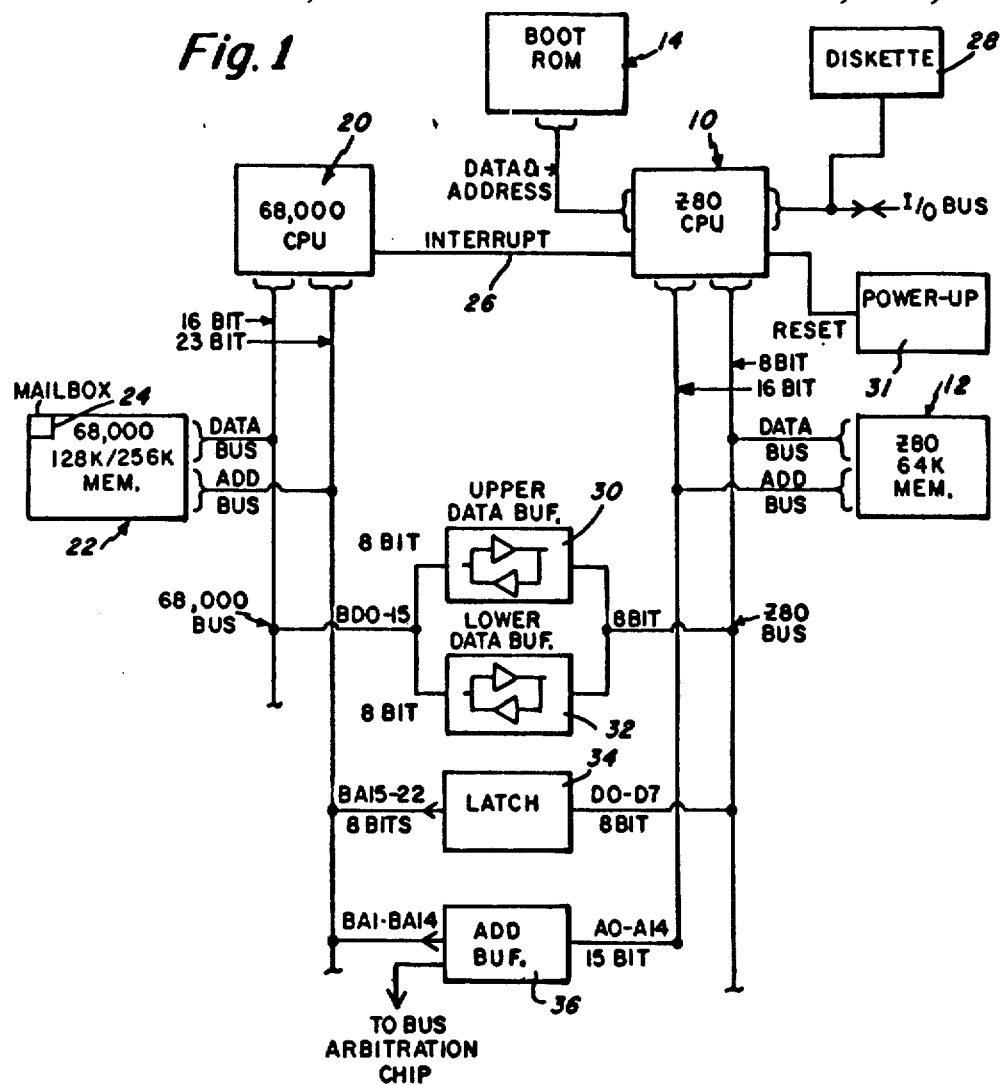
FIG. 1 is a block diagram of the microprocessor system of the present invention.

The principles of the present invention are described in connection with the block diagram of FIG. 1 which shows portions of a computer system which is a dual processor system. Generally speaking, one of the processors is dedicated to input/output tasks, while the other is dedicated to high-level language tasks. One of these microprocessors is an Intel Z80 microprocessor which is an 8-bit microprocessor identified in FIG. 1 as the CPU 10. The other microprocessor is preferably a Motorola MC68000 processor which on the other hand, is a 16-bit processor. The latter processor is identified in FIG. 1 as the CPU 20. The CPU 10 has 8 data lines and 16 address lines. These data and address lines together define the CPU 10 bus which of course includes a data bus and address bus. Similarly, the CPU 20 has an associated bus but this bus includes 16 data lines and 23 address lines. There is a separate memory depicted in FIG. 1 associated with each of the processors. There is a memory 12 associated with the CPU 10 and having associated therewith data and address lines which couple to the CPU 10 bus as indicated in FIG. 1. The memory 12 preferably has a capacity of 64K.

There is also a memory 22 associated with the CPU 20. This memory may have a capacity of 128K or 256K. Both of the memories 12 and 22, as discussed in further detail hereinafter, are connected so that the CPU 10 has access to both its own associated memory 12 and also to the memory 22 which the CPU 10 can access in 16K chunks. On the other hand the CPU 20 has access only to its own associated memory 22.

With regard to the CPU 20, this processor is of conventional design identified previously as a Motorola type MC68000 having 16-bit operation for high level language tasks. The processor supports direct access for up to 7 megabytes of memory, supports 8 levels of vectored interrupts, has 4 levels of fixed priority bus arbitration and also has a memory interface controller for interfacing with the processor 10. Although, in FIG. 1 the CPU 20 is shown in block form, it is understood that this comprises a central processing unit and also an interrupt controller which may be of type AM9519A.

The CPU 10, as mentioned previously, may be an Intel type Z80. Once again, although in FIG. 1 this is shown as a single block, it is understood that the Z80 processor 10 includes a Z80-A CPU (central processing unit), a Z80-A CTC (counter timer chip), a Z80-A DMA (direct memory access), and a Z80-A SIO (serial input/out). These different components are interconnected in a conventional manner enabling operation of the Z80 processor for use essentially as an I/O controller, at least for 16-bit operation.

As indicated in FIG. 1, there is associated with the processor 10, a boot ROM 14. The details of operation in connection with boot ROM operation are described hereinafter. The processor 10 provides boot-strap firmware which resides in the lower 2K of the 64K address space. The boot-strap firmware is switched out of the address space after boot-up is complete.

The aforementioned boot ROM 14 may be implemented by means of an erasable or non-erasable programmable read-only memory. The ROM 14 may be of type 2716 or type 2316. There are typically 8 data lines and 11 address lines along with enabling lines associated with this boot ROM.

When the system depicted in FIG. 1 is in operation as a 16 bit machine, the Z80 processor 10 functions as an I/O processor. Thus, it receives signals from the outside world over the I/O bus depicted in FIG. 1 and this information is transferred into the Z80 memory 12 which as mentioned previously, is a 64K capacity memory. Information in the memory 12 may then be formatted and transferred at high speed over internally connecting buses into the memory 22 where the data can be used by the processor 20. In this connection note the additional transfer devices depicted in FIG. 1 including an upper data buffer 30, a lower data buffer 32, a latch 34, and a data buffer 36. The operation of these devices is described in more detail hereinafter.

In order to perform high speed data transfer between the memory 12 and the memory 22, there is provided a special location referred to as a "mailbox" dedicated in the memory 22 which is adapted to receive commands initiated by the CPU 20. FIG. 1 diagrammatically illustrates this mailbox location or field 24. In connection with this operation, also note that there is a communication directly between the processors 10 and 20, referred to in FIG. 1 as an interrupt line 26. Actually, there may be multiple lines described in further detail hereinafter in connection with operation between these processors.

In order to transmit data to the I/O bus, the CPU 20 first stores data in its own memory 22 and places a special transfer command in the mailbox location 24. The CPU 20 then initiates an interrupt signal by activating one of the interrupt lines coupling to the processor 10 causing the processor 10 to branch to an interrupt program. This interrupt program causes the processor 10 to examine the mailbox location 24 in the memory 22 and retrieve the command that is stored therein. This command then causes the processor 10 to transfer the information out of the memory 22 via the internal data buses to its own memory 12. Now that the processor 10 has been able to transfer the information to its own memory, from there the information can be formatted and sent out from the processor 10 to the I/O bus.

In order to carry out transfers between the memories 12 and 22, as indicated previously, the processor 10 is provided with access to the other processor's memory, namely memory 22. The access to the memory 22 is by way of address lines from the processor 10. As indicated previously, the address bus associated with the processor 10 has 16 address lines. In FIG. 1 it is noted that addresses A0–A14 are shown coupling from the address bus to the address generator control buffer 36. This buffer may be a circuit chip of type LS 244 with two such LS 244 devices being used to provide the entire buffer. The output from the buffer 36 is shown as a single line but actually comprises a plurality of lines identified as address lines BA1–BA14. Thus, the buffer 36 is indicated in FIG. 1 as being an interconnecting link between the address bus of the processor 10 and the address bus of the processor 20. The control of address data through the buffer 36 is unidirectional. One other output taken from the buffer 36 is indicated in FIG. 1 as connecting to a bus arbitration chip. The bus arbitration circuitry is not described in detail herein, as it is considered to be of a conventional nature including a bus arbitration control chip of type 16R6. The bus arbitration operation allows other devices capable of being bus master to request, be granted, and acknowledge bus mastership. In fact, a bus request signal is used to enable data transfer through the buffer 36.

Figure 3:
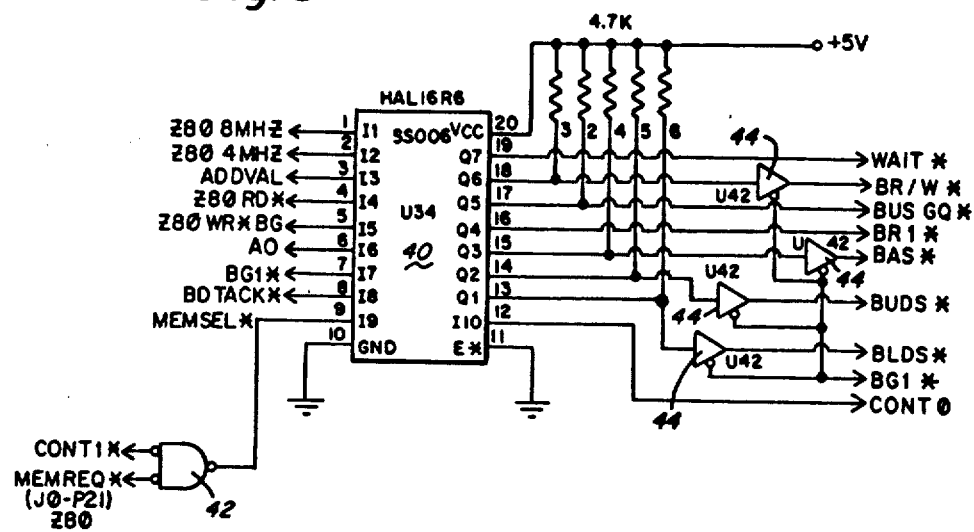
FIG. 3 shows a further component of the system that comprises a programmable logic array used in providing address control between the CPU's.

Reference is now made to FIG. 3 which shows a programmable logic array device 40. This device may be of type HAL 16R6. In FIG. 3 note the connection of the signal A0 at the input pin 6, input I6. This address signal is used to indicate to the device 40 whether an even or odd address is being generated.

FIG. 3 also shows, in addition to the device 40, a gate 42 and a series of enableable drivers all of which are identified by the designation 44. It is noted that all of the drivers are enabled by a bus grant signal identified in FIG. 3 as a signal BG1.

In order to clarify the operation each of the inputs and outputs are now described. The input at pin 1 to the device 40 shown in FIG. 3 is a 8MHz signal which is at twice the clock frequency of the Z80 CPU 10. The input signal at the pin 2 to the device 40 is at half that frequency of 8MHz. This is the direct clock frequency associated with the Z80 processor. Pin 3 at the corresponding input I3 is the signal ADDVAL which is a signal indicating a valid address or actually a valid range of the addresses that are to be interpreted by the main CPU 20. The signals at the input pins 4 and 5 are respective READ and WRITE signals from the Z80 processor 10. Discussion has been made previously with respect to the inputted pin 6, this being the signal AO.

The input at pin 7 which is input I7 to the device 40 is the signal BG1 which is the bus grant signal generated from the BUS arbitration control circuitry. The function of this signal is discussed in further detail hereinafter. The signal at the input pin 8 which is the signal BDTACK is a signal that goes low and is a reply from the memory that the address is valid. Finally, on the input side of the device 40 there is the input at pin 9 which is the memory select signal coupled from the gate 42. One of the inputs to the gate 42 is a memory request signal from the Z80 processor along with a second signal which functions as a master enable signal for the device 40.

On the output side of the device 40 the enable input is tied to ground at pin 11. Pin 12 is the signal CONTO. This is a control output which allows one to redefine what is even or odd as far as the address you are reading from or writing to.

At pin 11 which is the output Q1 there is generated by way of a driver 44 the signal BLDS. Along with this signal there is also the signal BUDS which is generated from the Q2 output at pin 14. These signals are respectively the bus lower and upper data strobes. These signals are used in association with the CPU 20 and in particular its memory for the transfer of data thereto and the reading of data therefrom.

With respect to pin 15 of the device 40 this is an output that is referred to as the signal BAS which is a address strobe. This is a signal that is generated after the bus grant. And in this regard note the enabling bus grant signal that couples to the respective driver 44. The signal BAS that is generated initiates the cycle of the CPU 20.

The next output from the device 40 is at pin 16 and is the signal BR1 which is the bus request signal. When this signal goes low it indicates to the bus arbitration circuit that someone is requesting access to the CPU bus. In other words this signal tells the CPU 20 that someone wants access to its bus. At pin 17 from the device 40 is the bus grant request signal BUSGQ. This is a signal that is essentially the same as the signal BG1 but delayed by one clock cycle.

At pin 18 of the device 40 is a signal coupled by way of a driver 44 and identified as the signal BR/W. This is the bus READ/WRITE signal coupled to the memory associated with the CPU 20 for indicating whether the memory is in a READ or WRITE cycle. Finally, at pin 19 of the device 40 is the signal WAIT which couples back to the Z80 processor and suspends or freezes the Z80 processor information until the bus grant becomes valid.

In summary, the address control is essentially initiated by the signal CONTI which signals the device 40 to look at the inputs to see if they are valid and to see if they initiate transfers to or from the memory of the CPU 20 once this signal is activated. The device 40 is looking for the Z80 bus cycle in the correct address range. Next, the WAIT signal is generated which indicates that the CPU is not quite ready for operation. The bus request signal is then sent to the bus arbitration circuit and a waiting period may occur while the CPU 20 is finishing a processing cycle. Thereafter, a bus grant is executed with the signal BG1 going low. This signal then enables the drivers 44 to initiate READ and WRITE cycles for memory control. Thereafter, the WAIT signal is released permitting the Z80 processor to transfer data under READ and WRITE control to or from the CPU 20 memory.

It is also noted from FIG. 1, that in addition to the buffer 36, there is also provided a latch device 34. This provides an additional 8 bits of address signal provided from the processor 10 over its 8 data output lines. In FIG. 1 these lines are defined as data signals D0–D7 totaling 8 bits. These data signals, used as address signals are latched in the latch 34 and provided to the address bus associated with the processor 20. These addresses are indicated on the processor 20 side of the latch as processor 20 addresses BA15–BA22. Thus, the processor 10 provides a total of 22 address signals to the address bus of the processor 20.

In accordance with the embodiment described herein, the processor 10 is adapted to access a portion of the memory space of memory 22. The processor 10 preferably accesses a 16K page at a time. However, the processor 10 first selects the page by putting the address signals on its bus into a latch, which in the embodiment of FIG. 1 is the latch 34. Actually, these address signals are generated on the data bus of the processor 10. The locations on each page are then addressed by manipulating the lower 14 address bits by way of the buffer 36.

With regard to data transfers, these are accomplished over the internal buses which connect the processor 10 data bus with the processor 20 data bus. This data transfer is illustrated in FIG. 1 by means of the data buffers 30 and 32, more particularly referred to as an upper data buffer 30 and a lower data buffer 32. It is noted that these buffers interconnect the data buses of the respective processors 10 and 20. On the processor 10 side, the 8-bits of data on the data bus couple in common to each of the data buffers. On the processor 20 side, the 16-bits are coupled to the 16-bit data bus, identified in FIG. 1 as the data signals BD0–BD15.

Illustrated in FIG. 1 is the aforementioned latch 34 and address buffer 36. As indicated previously, the latch 34 may be comprised of two separate latch devices, each of type LS244. A bus request signal (not shown) is used to enable these buffers. The latch 34 functions as an address generator interconnected between the processor buses. This may be a latch of type MC3482B and may also be controlled by a bus grant signal. With respect to the data buffers 30 and 32, these may each be of type LS245. These data buffers are bi-directional and include enabling circuits for providing proper timing in the transfer of data.

Figure 2:
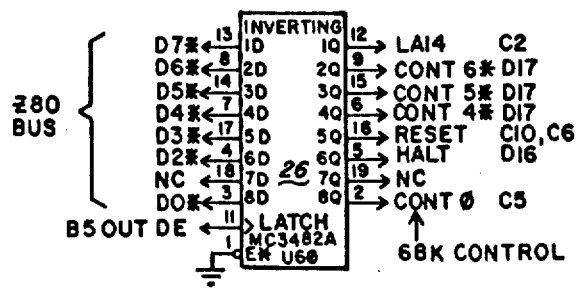
FIG. 2 shows a further component of the system including a control latch.

In addition to the latch 34, there is also provided a latch 26 shown in FIG. 2 which connects to the data bus of the processor 10 and has its outputs used as control for the CPU 20. Thus, the latch 26 shown in FIG. 2 may be referred to as a control latch which allows the processor 10 to halt or reset the processor 20 to enable the boot-up operation to be described hereinafter. The latch 26 may be of type MC3482A. It is noted that its inputs couple from the data bus of the processor 10. The outputs include a halt output, a reset output and a plurality of interrupt outputs referred to as CONT 0, CONT 4, CONT 5, and CONT 6.

Communication between the two processors is accomplished with the processor 10 initiating interrupts to the processor 20, and also indicating I/0 completion. The processor 10 may periodically poll the memory 22 of the processor 12 to recognize requests for service from the processor 20.

Optionally, the processor 20 can generate an interrupt to the processor 10 by accessing a decoded memory 22 location. Once a request for service has been recognized by the processor 10, a descriptor block is read into the memory 12 from the memory 22 to determine the specific service required. Prior to attempting a memory transfer by the CPU 10 to or from the memory 22, all memory 12 pages are deselected by resetting the lower nibble of port OFFH. The stack and control program is located in the lower 32K of the processor 10 address space, since page 0 is not to be disabled.

The memory 22 shown in FIG. 1, is a random access memory with a total capacity of 128K words (256K bytes) of data with optional byte parity for error detection. It is for use with the processor 20. The processor 20 has a 16-bit wide data bus as indicated previously, and therefore, the memory 22 also has a 16-bit wide data bus connected thereto.

However, because the processor 20 needs to handle both 8 and 16-bit wide data transactions, the memory 22 is further divided into upper and lower bytes with each byte being 8-bits. Actually, all transfers to and from the memory 22 are treated as byte transfers. If a full 16-bit transfer is desired, an upper and lower byte transaction is performed simultaneously. Thus, the memory is organized as two parallel byte memories which share a common memory space. There are also means provided for parity checking. However, because the parity checking does not effect the concepts of the invention, it is not described in any detail herein.

The construction of both memories 12 and 22 shown in FIG. 1 is substantially conventional. With regard to memory 12, as indicated previously, this is a memory having a data capacity of 64K. With regard to the memory 22, this is a dynamic random access memory comprising a series of integrated circuity chips each containing 65,536 (64K) single bit locations. Therefore, to store each byte with parity, 9 integrated circuits are required. Each chip may be of type MCM 6665.

Two particulars of dynamic random access memories are address multiplexing and refresh. There are 16 address lines to access this amount of memory. Address line A0, internal to the CPU 20, is used to distinguish between upper and lower bytes. Then, bits A1-A16 identify the remainder of the address. Therefore, the address lines are loaded into memory in two parts:

1. Row address (A1-A8), first by the Row Address Strobe (RAS).

2. Column address (A9-A16), second by the Column Address Strobe (CAS).

Once the addresses are loaded, the memory alters or presents the data at that location, depending on the state of the read/write signal. Refresh is required to maintain the information stored in the memory. In this connection every two milliseconds, the entire contents of the memory are refreshed. Due to the memory structure, this requires 128 refresh only accesses every two milliseconds, or one every 16.0 microseconds.

Although FIG. 1 only schematically shows the memory 22, it is understood that in addition to memory storage space, there is also control associated with the memory. For example, the address lines BA1-BA16 are routed to the memory through two-line, receiver-inverting buffers which are permanently enabled. These buffers may be of type 74S240. The lower 8 address lines, namely lines BA1-BA8 are multiplexed with 8 refresh address bits from the refresh address counter (not shown) thus becoming the 8 memory row address bits.

The row address bits are then multiplexed with the column address bits which are address lines BA9--BA16, thus becoming the 8 multiplexed address bits. The memory address lines are routed to all memory chips through series resistors to reduce ringing and overshoot. The address line BA17 is routed to the memory and enables gating to generate the signal RAS for the lower or upper 120K memory page. Address lines BA18-BA22 are used to enable the memory at a specific 256K location within the processor 20 sub-system memory map allocation.

Thus, the memory 22 is accessed by 16 bits of information with the remaining bits being used to determine the location of the 256K memory in the address bit. That is, the processor 20 has 23 address bits which are equivalent to about 16 megabytes. In order to determine where in that 16 megabytes the 256K memory is located, the remaining 8-bits are put into a comparator which is an 8-bit magnitude comparator such as type LS688. This comparator compares two 8-bit inputs. Address lines are compared with a preset value by the use of a dip switch. If the signals match, then the memory is enabled and if they don't match then it is not enabled.

Also, as mentioned previously, the memory chips that are used in the memory 22 are addressed by means of a multiplex arrangement. That is, 8 address signals are provided to the chips and the lower 8-bits of the address are first placed on the 8 leads and strobed into the memory chips by means of a Row Address Strobe (RAS) signal. Then, the lower 8-bit signals are removed, the upper 8-bit signals are placed on the line and strobed into the memory by a Column Address Strobe (CAS) signal. This type of addressing is standard operation and dynamic random access memories and is thus not shown in detail herein.

Now, with regard to the unique start-up or boot procedure of the present invention, reference is made to FIG. 1 and the boot ROM 14 described previously, coupled to the processor 10. As indicated previously, this boot ROM may be of type 2716 or of type 2316. Type 2716 is an erasable programmable ROM while type 2316 is a masked ROM. This boot ROM 14 has 8 data lines and 11 address lines along with enable signals therefor. During this boot-up procedure at power-up, the boot ROM loads a boot strap program into the memory 12 associated with processor 10. This boot program then loads the software for both processors which determines that the processor 12 is the main processor while the processor 10 functions as an I/O processor. This boot-up procedure allows the processor 10 to turn on first, and thus makes the system initially appear as a first generation system, so that the system is compatible with first generation software written for an 8-bit machine, even though the machine is capable of operating as a 16-bit machine. This is important because it allows the system to run 8-bit software. This feature allows the purchaser to move easily from one generation to the other without having to reprogram all the operations during the transition.

More particularly, when the computer system is initially started up, there is a register in the processor 10 which causes the boot ROM 14 to be interpreted as the lower 2K of memory. Thus, the boot ROM 14 in a sense replaces a portion of the memory 12 during this power-up phase. At power-up there is a reset signal that is generated, at the output of a circuit which is referred to as the power on and manual reset logic circuit 31. The reset signal to the processor 10 causes it to go to location 0 and extract the instruction therein and execute it. This instruction is the first instruction in a boot program and thus at power-up the processor 10 simply looks at the boot ROM 14 first instruction in a boot-up program which causes the processor 10 to access specified tracks and sectors in an attached diskette 28 so as to load in the operating system from the diskette into the 64K memory 12 associated with the processor 10. The operating system from the diskette is stored in the memory 12 at a location starting directly above the lower 2K of memory, namely at location 2001. Thus, at power-up with the generation of a reset signal, as schematically illustrated by the power-up circuit 31, the processor 10 is adapted to interpret the first memory spaces as from the ROM 14 rather than from the memory 12. This has the effect of causing the processor 10 to transfer the operating program from the diskette 28 into the memory 12 but starting at memory location 2001.

After the processor 10 operating program is stored in the memory 12, the boot ROM 14 has an instruction which causes the processor 10 to jump to a location in the operating system which starts the operating system running. This thus completes the initialization of the system. When the operating system begins to run, one of the first things that happens is that it shuts the aforementioned register in the processor 10 which had caused the processor to access the boot ROM by accessing the lower 2K of memory. The operating system instead, once it begins to run, causes the processor 10 to access the 64K memory 12 rather than the boot ROM. Thus, the boot ROM 14 is taken out of the system and no longer has any effect until the system is again reset.

Herein, reference is made to an 8-bit operating program and a 16-bit operating program. The former may be referred to in connection with a first generation machine while the latter may be referred to in connection with a second generation machine. In accordance with the present invention it is desired to be able to use operating programs previously used with a first generation machine, on a second generation machine as described herein. If the system of the present invention is to be operated as an 8-bit machine, then once the initialization is completed, nothing further happens and in essence the second processor 20 is never enabled. In this connection, reference can be made to FIG. 2 and the latch 26 which has a reset output which has both reset and halt outputs which maintain the processor 20 reset or inactive until the proper signals are generated on the processor 10 bus. Thus, the system of the present invention, although termed a second generation system is usable with first generation programs and operating systems and operates in this manner by simply not enabling operation of the processor 20 with all processing being done by the processor 10. In this mode of operation, the processor 10 thus does not act predominantly only as an I/O processor, but instead is the main processor.

If on the other hand, the system is to operate as a 16-bit machine, a different diskette 28 is used, which contains the processor 10 operating system along with an additional code. This additional code causes the processor 10 to load in the operating system for the processor 20 into the memory 12 associated with processor 10. The processor 10 then generates a command to transfer the operating system just entered from the memory 12 into the memory 22. This transfer of data from memory-to-memory has been described in detail hereinbefore. The processor 20 at this time, however, does not respond because the processor 10 is controlling it to be in its halt and reset mode. Again, reference can be made to FIG. 2 which indicates these reset and halt signals being generated from the processor 10 data bus.

After the operating system for the processor 20 has been transferred from the 64K memory 12 to the memory 22, the processor 10 resets itself and at substantially the same time releases the halt on the processor 20. The processor 20 is then able to boot itself up using the program now stored in its memory 22. In this way, the processor 20 assumes control of the system and in turn now controls the processor 10 by means of the internal interrupt operation indicated by the interrupt line 26 illustrated in FIG. 1.

As indicated previously, in connection with FIG. 2, it is noted that some of the outputs of the latch 26 are interrupt outputs generated from the processor 10 data bus. Thus, these are interrupts that are initiated by the processor 10. By way of example, some of the these signals are CONT 4, CONT 5, and CONT 6. Their corresponding respective vector locations are 234H, 238H and 23CH. As also indicated previously, the interrupt control function for the system is implemented with an interrupt controller such as the type AM9519 not specifically described herein but considered to be of conventional design. A single unit manages up to 8 maskable interrupt request inputs, resolves priorities and supplies the vector number response to the processor 20 at interrupt acknowledge time. When the controller receives an unmasked interrupt request, it issues a group interrupt request to the processor 20. When the interrupt is acknowledged, the controller outputs the pre-programmed vector number corresponding to the highest priority unmasked interrupt request.

Having described one embodiment of the present invention, it should now be apparent to those skilled in the art that numerous other embodiments are contemplated as falling within the scope of this invention.

What is claimed is:

1. A microprocessor system comprising;
    a first processor,
    a second processor,
    means intercoupling the first and second processors including an address bus and a data bus associated with the first processor and an address bus and a data bus associated with the second processor,
    a first memory associated with the first processor and coupled thereto via the first processor address bus and data bus,
    a second memory associated with the second processor and coupled thereto via the second processor address bus and data bus,
    a third memory associated with the first processor and comprising a read-only memory for storing a boot strap control program,
    power-up reset circuit means including means for generating a reset signal and means coupling the reset signal to the first processor causing first processor instruction operation in accordance with the boot strap control program to load the operating system into the first memory, means responsive to said program after loading of the operating system to terminate operation in accordance with the boot strap control program and commence operation in accordance with the operating system, and control means responsive to a first operating system type code for establishing control of said microprocessor system in said first processor and holding said second processor in an inactive state, and responsive to a second operating system type code for transferring control of said microprocessor system to said second processor.

2. A microprocessor system as set forth in claim 1 including means for reading the operating system type to determine if the operating system is for 8-bit operation or 16-bit operation.

3. A microprocessor system as set forth in claim 2 including means responsive to an 8-bit signal for maintaining a halt signal on the second processor to disable the operation of the second processor.

4. A microprocessor system as set forth in claim 3 including means responsive to a 16-bit signal code for releasing the halt signal to enable operation of the second processor.

5. A microprocessor system as set forth in claim 4 including means responsive to said code for first loading the operating system into the first memory.

6. A microprocessor system as set forth in claim 5 including means responsive to said code for transferring the operating system from the first memory to the second memory.

7. A microprocessor system as set forth in claim 6 wherein the second processor controls the first processor to function as an I/O processor.

8. A microprocessor system as set forth in claim 7 wherein the operating system is entered to the first processor from a storage means coupled to the I/O bus.

9. A microprocessor system as set forth in claim 1 wherein said first processor is of type Z80 having 8 data lines and 16 address lines.

10. A microprocessor system as set forth in claim 1 wherein said second processor is of type MC 68000 having 16 data lines and 23 address lines.

11. A microprocessor system as set forth in claim 1 including interrupt lines intercoupling the first and second processors.

12. A microprocessor system as set forth in claim 1 wherein said means intercoupling the processors includes data buffer means.

13. A microprocessor system as set forth in claim 12 including an upper data buffer and a lower data buffer.

14. A microprocessor system as set forth in claim 12 including a latch means intercoupling the data lines of the first processor with first order address lines of the second processor.

15. A microprocessor system as set forth in claim 14 including an address buffer intercoupling the address lines of the first processor with second order address lines of the second processor.

16. A microprocessor system as set forth in claim 1 wherein the first processor has a smaller memory capacity than the second processor.

17. A microprocessor system as set forth in claim 1 wherein said second memory includes a mailbox location for controlling data transfer between memories.

18. a microprocessor system having means for inputting an operating system comprising:

a first processor;

a second processor;

means intercoupling the first and second processors including an address bus and a data bus associated with the first processor and an address bus and a data bus associated with the second processor;

a first memory associated with the first processor and coupled thereto via the first proccessor address bus and data bus;

a second memory associated wit the second processor and coupled thereto via the second processor address bus and data bus;

means associated with the first processor for loading the operating system into the first memory, said operating system containing a code indicating operating system type; and control means responsive to a first operating system type code for establishing control of said microprocessor system in said first processor and holding said second processor in an inactive state, and responsive to a second operating system type code for transferring control of said microprocessor system to said second processor.

19. A microprocessor system as defined in claim 18 wherein said control means includes means responsive to said second operating system type code for operating said first processor as an input/output processor for said second processor.

20. A microprocessor system as defined in claim 19 wherein said first operating system type operates with eight bits and said second operating sytem type operates with sixteen bits.

21. A microprocessor system as defined in claim 19 wherein said control means includes means responsive to the first operating system type code for holding said second processor in an inactive state.

22. A microprocessor system as defined in claim 18 wherein said first operating system type is for operation with one word size and said second operating system type is for operation with another word size.

23. A microprocessor system as defined in claim 18 wherein said control means includes means responsive to the second operating system type code for transferring the operating system to the second memory.

* * * * *